United States Patent
Lin

(10) Patent No.: US 6,568,296 B1
(45) Date of Patent: May 27, 2003

(54) CRANK ARM QUICK RELEASE DEVICE OF BICYCLE

(75) Inventor: Yung-Sung Lin, Taichung (TW)

(73) Assignee: Shih Tsao Lin, Taiping (TW)

( * ) Notice: Subject to any disclaimer, the term of this patent is extended or adjusted under 35 U.S.C. 154(b) by 0 days.

(21) Appl. No.: 10/004,871

(22) Filed: Dec. 7, 2001

(51) Int. Cl.[7] .................................................. G05G 1/14
(52) U.S. Cl. ..................... 74/594.1; 74/594.2; 403/381
(58) Field of Search .................. 74/594.1–594.7; 384/458; 403/4, 381

(56) References Cited

U.S. PATENT DOCUMENTS

| | | | |
|---|---|---|---|
| 626,227 A | * 6/1899 | Gaylor | 74/594.1 |
| 4,373,760 A | * 2/1983 | Durham | 308/179.5 |
| 4,446,753 A | * 5/1984 | Nagano | 74/594.1 |
| 5,387,047 A | * 2/1995 | Korpi | 403/4 |
| 5,586,472 A | * 12/1996 | Lin | 74/594.1 |
| 5,934,155 A | * 8/1999 | Lai | 74/594.1 |
| 6,199,449 B1 | * 3/2001 | Harrington | 74/594.1 |

* cited by examiner

Primary Examiner—Vinh T. Luong
(74) Attorney, Agent, or Firm—Rosenberg, Klein & Lee

(57) ABSTRACT

The crank arm quick release device of a bicycle includes a fixing threaded sleeve screwed on the rotation shaft of the pedal, and a crank arm formed with locking recesses for locking and fixing the fixing threaded sleeve. Thus, the pedal may be mounted on the crank arm easily and quickly.

3 Claims, 5 Drawing Sheets

CRANK ARM QUICK RELEASE DEVICE OF BICYCLE

BACKGROUND OF THE INVENTION

1. Field of the Invention

The present invention relates to a crank arm quick release device of a bicycle, and more particularly to a crank arm quick release device of a bicycle, wherein the pedal may be mounted on and detached from the crank arm easily and quickly.

2. Description of the Related Art

A conventional combination of a crank arm 20 and a pedal 30 in accordance with the prior art is shown in FIG. 5. The crank arm 20 has a free end formed with a screw bore 200. The pedal 30 has one end protruded with a rotation shaft 31 which has a free end formed with a screw portion 32 that may be extended through a washer 33, and may be screwed into the screw bore 200 of the crank arm 20. The crank arm 20 and the screw portion 32 of the rotation shaft 31 of the pedal 30 of the left side and the right side may form a reverse screw design which may prevent detachment of the pedal 30 when the pedal is stepped.

However, the crank arm 20 and the pedal 30 are combined by a reverse screw design. Thus, if the user rotates the pedal 30 in the opposite direction, the screw bore 200 of the crank arm 20 is easily worn out due to the wrong direction of rotation. In addition, the user has to screw the screw portion 32 of the rotation shaft 31 of the pedal 30 in the screw bore 200 of the crank arm 20, so that the assembly and disassembly thereof are inconvenient and slow.

SUMMARY OF THE INVENTION

The present invention has arisen to mitigate and/or obviate the disadvantage of the conventional combination of a crank arm and a pedal.

The primary objective of the present invention is to provide a crank arm quick release device of a bicycle, wherein the pedal may be mounted on and detached from the crank arm easily and quickly.

Another objective of the present invention is to provide a crank arm quick release device of a bicycle, which may be adapted to suit the pedal of a common bicycle, without having to make a new pedal, thereby saving cost of fabrication.

In accordance with the present invention, there is provided a crank arm quick release device of a bicycle, comprising:

a pedal, having one end protruded with a rotation shaft which has a free end formed with a screw portion having an outer thread;

a fixing threaded sleeve, having a center formed with a screw bore that may be screwed on the screw portion of the rotation shaft of the pedal, the fixing threaded sleeve having an outer wall protruded with two radially opposite locking flanges; and a crank arm, having a free end formed with a mounting hole for insertion of the fixing threaded sleeve, the mounting hole of the crank arm being recessed with two insertion guide grooves for insertion of the two locking flanges of the fixing threaded sleeve, each of the two insertion guide grooves having one side formed with a locking recess which has a depth slightly greater than the thickness of the locking flange, and is communicated with the insertion guide groove, the locking recess of each of the two insertion guide grooves being distributed on a diameter of the mounting hole.

Further benefits and advantages of the present invention will become apparent after a careful reading of the detailed description with appropriate reference to the accompanying drawings.

DETAILED DESCRIPTION OF THE INVENTION

Figure 1:
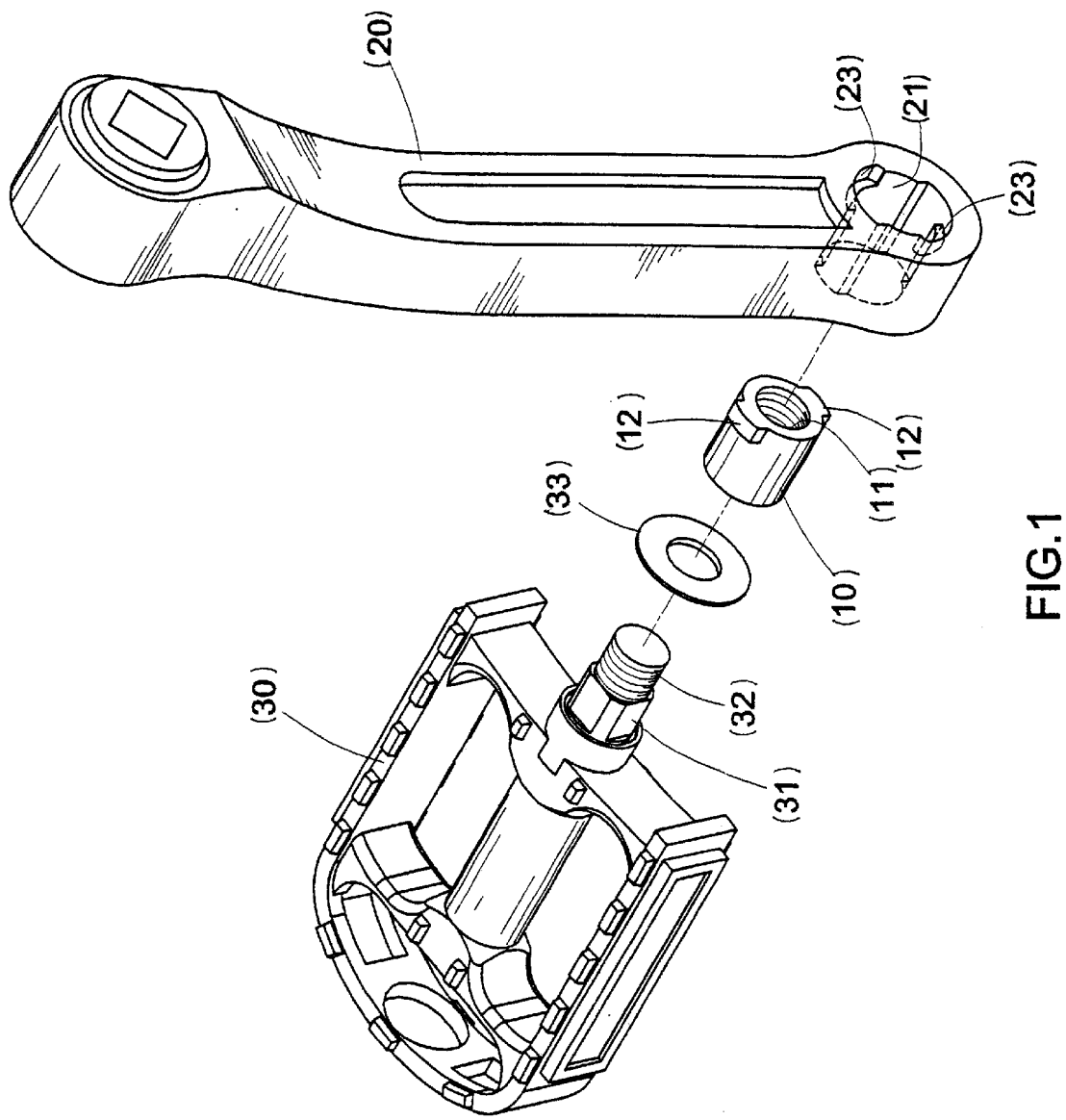
FIG. 1 is an exploded perspective view of a left sided crank arm quick release device of a bicycle in accordance with the preferred embodiment of the present invention.
Figure 2:
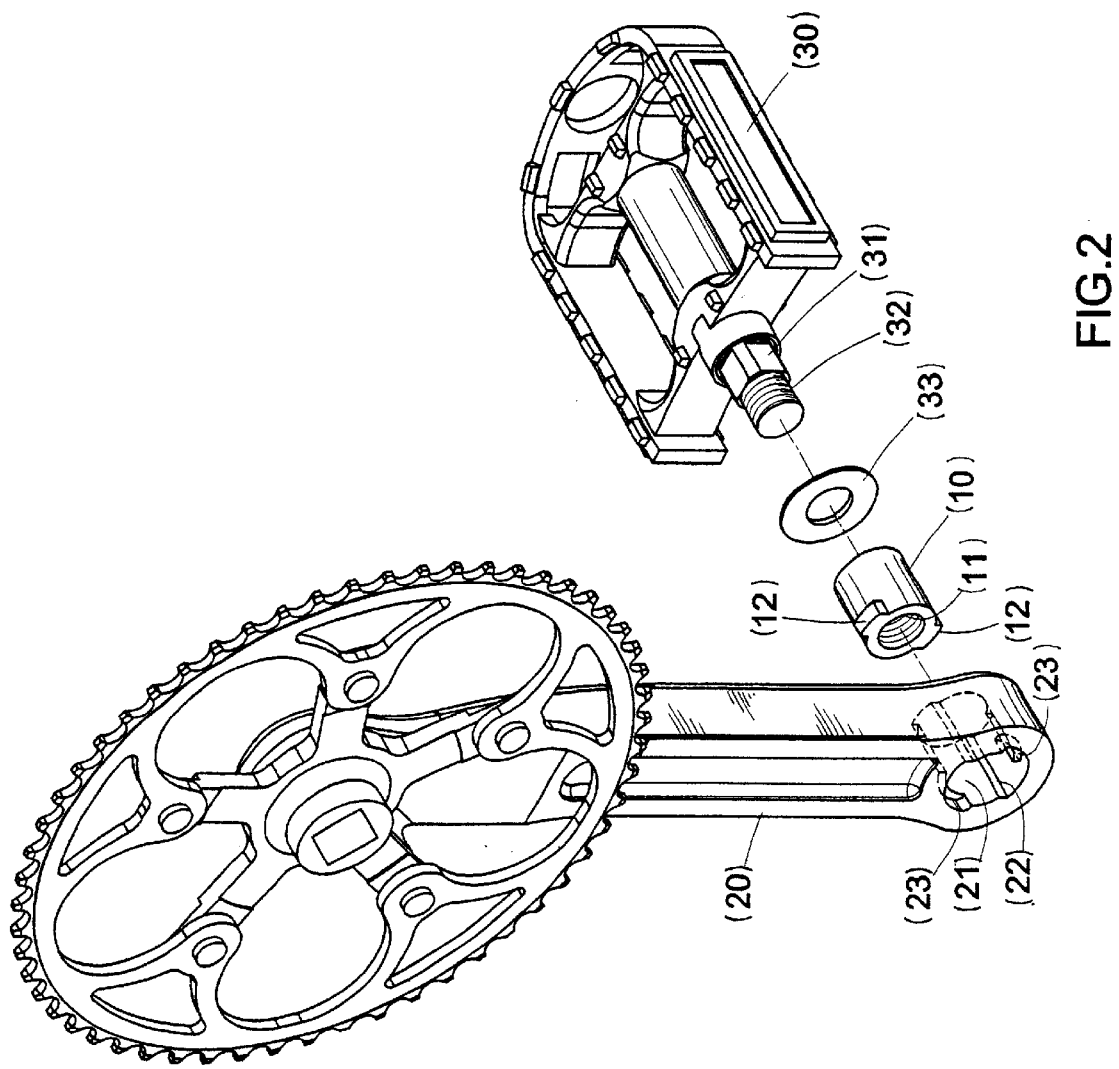
FIG. 2 is an exploded perspective view of a right sided crank arm quick release device of a bicycle in accordance with the preferred embodiment of the present invention.

Referring to the drawings and initially to FIGS. 1–4, a crank arm quick release device of a bicycle in accordance with a preferred embodiment of the present invention comprises a fixing threaded sleeve 10, a crank arm 20, and a pedal 30. The pedal 30 may be a left sided pedal as shown in FIG. 1 or a right sided pedal as shown in FIG. 2.

The pedal 30 has one end protruded with a rotation shaft 31 which has a free end formed with a screw portion 32 having an outer thread.

Figure 4:
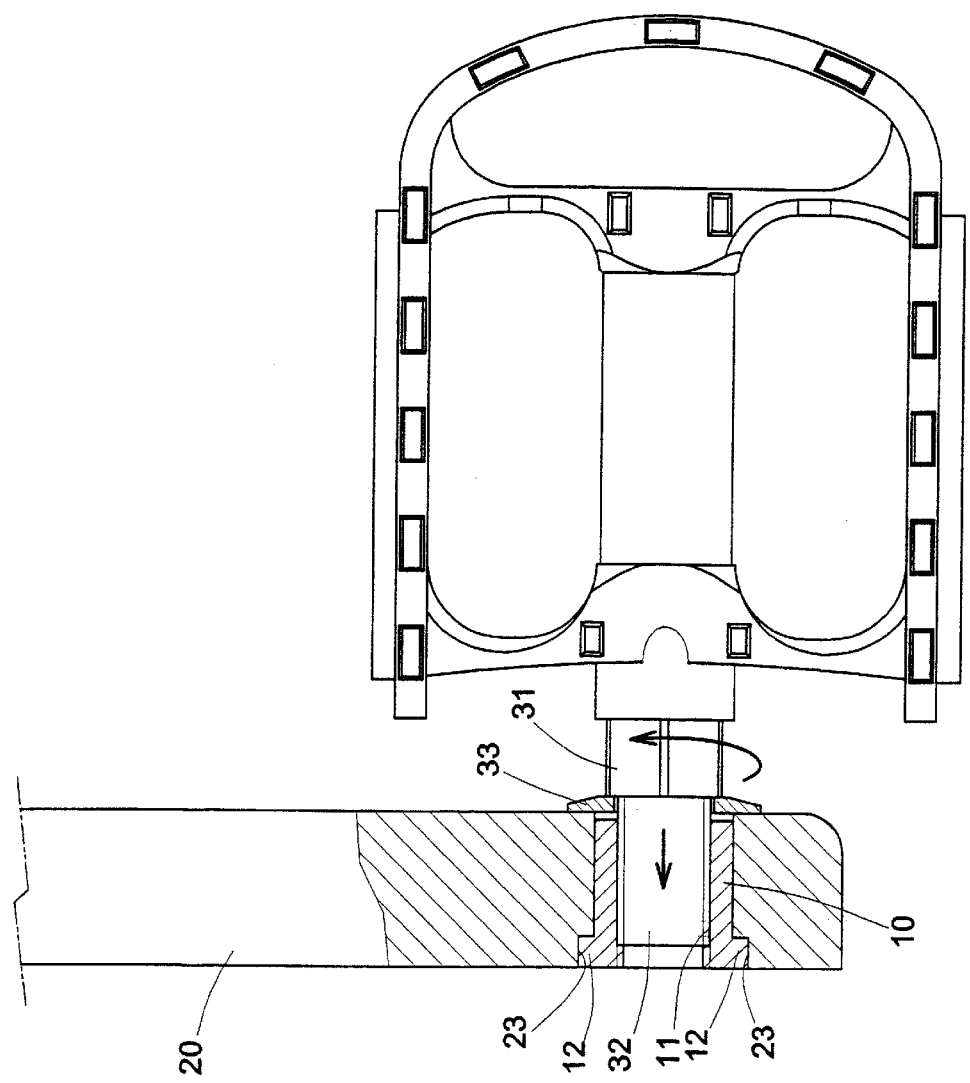
FIG. 4 is a cross-sectional assembly view of the crank arm quick release device of a bicycle in accordance with the preferred embodiment of the present invention.
Figure 5:
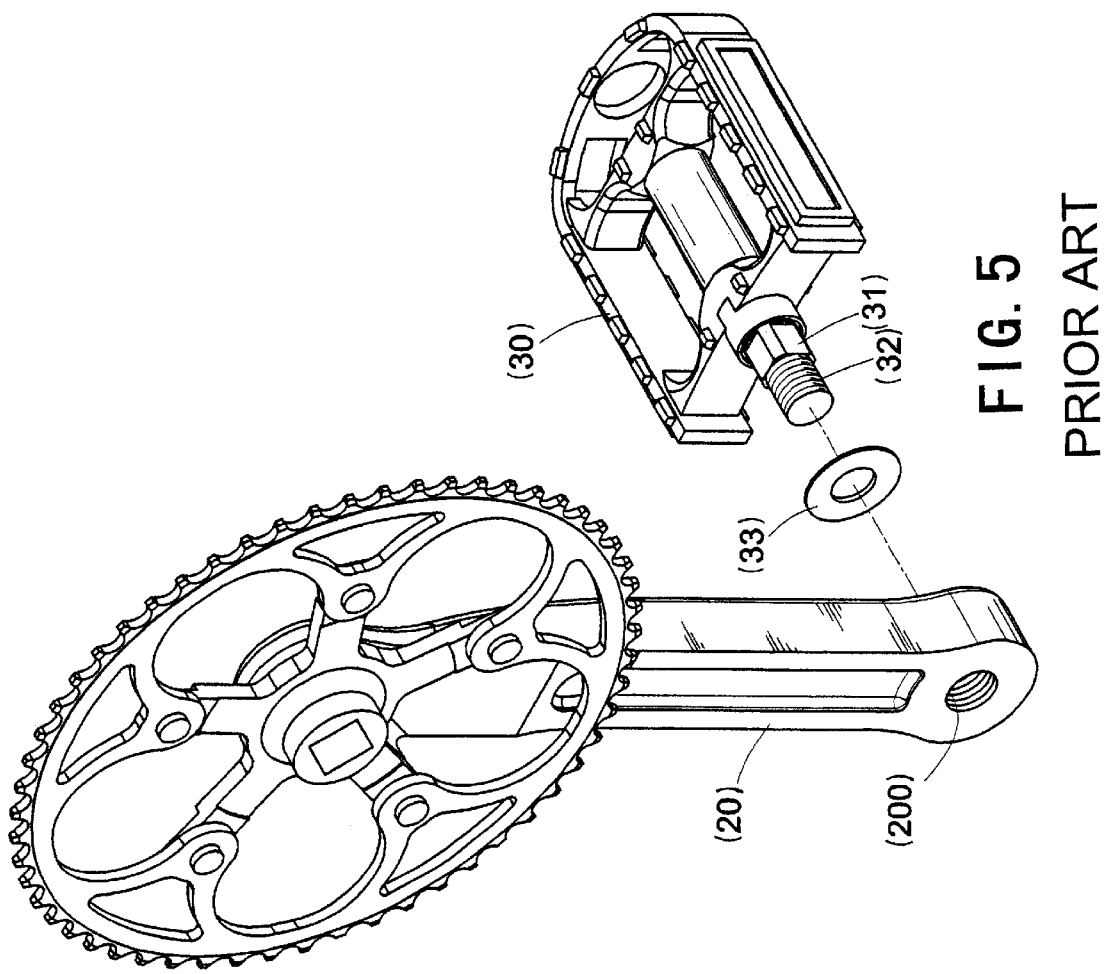
FIG. 5 is an exploded view of a conventional combination of a crank arm and a pedal in accordance with the prior art.

The fixing threaded sleeve 10 has a center formed with a screw bore 11 that may be screwed on the screw portion 32 of the rotation shaft 31 of the pedal 30 as shown in FIG. 4. The fixing threaded sleeve 10 has an outer wall protruded with two radially opposite locking flanges 12.

The crank arm 20 has a free end formed with a mounting hole 21 for insertion of the fixing threaded sleeve 10. The mounting hole 21 of the crank arm 20 is recessed with two insertion guide grooves 22 for insertion of the two locking flanges 12 of the fixing threaded sleeve 10. Each of the two insertion guide grooves 22 has one side formed with a locking recess 23 which has a depth slightly greater than the thickness of the locking flange 12, and is communicated with the insertion guide groove 22. The locking recess 23 of each of the two insertion guide grooves 22 is distributed on a diameter of the mounting hole 21.

In assembly of the present invention, the fixing threaded sleeve 10 together with a washer 33 is initially screwed on the screw portion 32 of the rotation shaft 31 of the pedal 30. Then, the fixing threaded sleeve 10 is inserted into the mounting hole 21 of the crank arm 20, and each of the two locking flanges 12 of the fixing threaded sleeve 10 is inserted into the respective insertion guide groove 22 of the mounting hole 21 of the crank arm 20 to align with the position of the locking recess 23. Then, the rotation shaft 31 of the pedal 30 may be rotated by a wrench through about one quarter circle, whereby each of the two locking flanges 12 of the fixing threaded sleeve 10 may be rotated in the respective insertion guide groove 22 of the mounting hole 21 of the crank arm 20 to reach the position of the respective locking recess 23, so that each of the two locking flanges 12 of the fixing threaded sleeve 10 may be rested on the side of the respective locking recess 23 of the respective insertion guide groove 22 of the mounting hole 21 of the crank arm 20, thereby forming a positioning and locking effect.

At this time, the rotation shaft 31 of the pedal 30 may be further rotated through about one circle, so that the screw portion 32 of the rotation shaft 31 of the pedal 30 may be screwed toward the crank arm 20 as indicated by the arrow shown in FIG. 4, so that the rotation shaft 31 of the pedal 30 may be screwed and fixed in the crank arm 20, thereby achieving a quick screwing fixing effect.

In addition, in disassembly of the present invention, the rotation shaft 31 of the pedal 30 may be rotated reversely through about one and a quarter circle, whereby each of the two locking flanges 12 of the fixing threaded sleeve 10 may be rotated in the respective insertion guide groove 22 of the mounting hole 21 of the crank arm 20 to detach from the respective locking recess 23, so that the fixing threaded sleeve 10 may be detached from the mounting hole 21 of the crank arm 20. Thus, the pedal 30 may be detached from the crank arm 20 easily and quickly.

Figure 3:
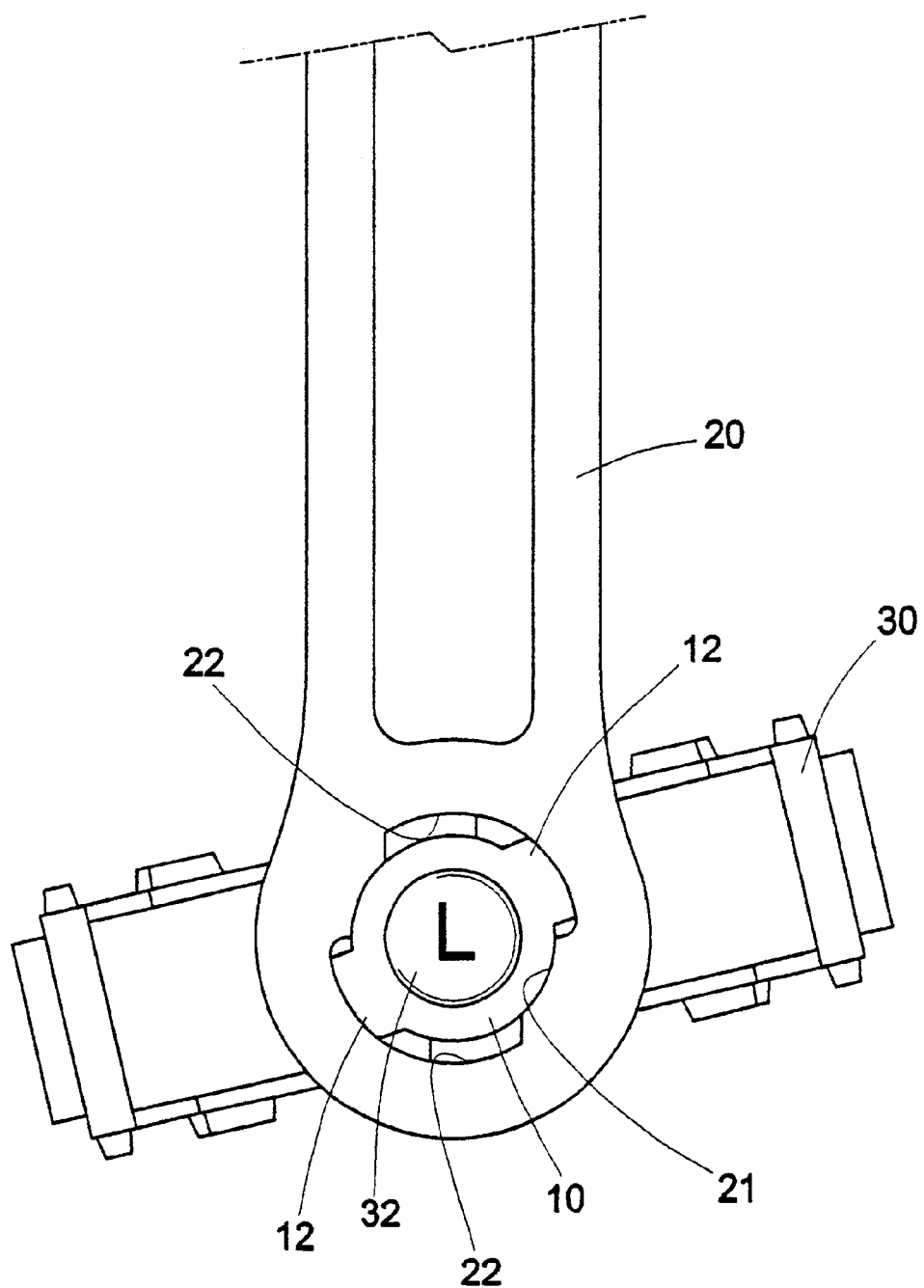
FIG. 3 is a plan assembly view of the crank arm quick release device of a bicycle in accordance with the preferred embodiment of the present invention.

Referring to FIG. 3, the two locking flanges 12 of the fixing threaded sleeve 10 of a left sided pedal 30 as shown in FIG. 1 or a right sided pedal 30 as shown in FIG. 2 may form an eccentric arrangement of a different direction, and relatively, the opposite insertion guide grooves 22 of the mounting hole 21 of the crank arm 20 may also form an eccentric arrangement of a different direction, so that the fixing threaded sleeve 10 of a left sided pedal 30 as shown in FIG. 1 or a right sided pedal 30 as shown in FIG. 2 may be fitted into the mounting hole 21 of a left sided crank arm 20 as shown in FIG. 1 or a right sided crank arm 20 as shown in FIG. 2, thereby preventing erroneous assembly of the crank arm quick release device of a bicycle of the present invention.

In addition, the crank arm quick release device of a bicycle of the present invention may be adapted to suit the pedal 30 of a common bicycle, without having to make a new pedal, thereby saving cost of fabrication.

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A crank arm quick release device of a bicycle, comprising:
    a pedal, having one end formed with a rotation shaft which has a free end formed with a screw portion having an outer thread;
    a fixing threaded sleeve, having a center formed with a screw bore screwed on the screw portion of the rotation shaft of the pedal, the fixing threaded sleeve having an outer wall protruded with two radially opposite locking flanges; and
    a crank arm, having a free end formed with a mounting hole for insertion of the fixing threaded sleeve, the mounting hole of the crank arm being having a wall formed with two insertion guide grooves for insertion of the two locking flanges of the fixing threaded sleeve, each of the two insertion guide grooves having one side formed with a locking recess for locking the respective locking flange of the fixing threaded sleeve by rotation of the fixing threaded sleeve, the locking recess of each of the two insertion guide grooves being distributed on a diameter of the mounting hole.

2. The crank arm quick release device of a bicycle in accordance with claim 1, wherein the two locking flanges of the fixing threaded sleeve form an eccentric arrangement, and the two opposite insertion guide grooves of the mounting hole of the crank arm form an opposite eccentric arrangement.

3. The crank arm quick release device of a bicycle in accordance with claim 1, wherein the rotation shaft of the pedal is fitted with a washer which is mounted between the fixing threaded sleeve and the rotation shaft.

* * * * *